United States Patent
Yan et al.

(10) Patent No.: US 12,185,270 B2
(45) Date of Patent: Dec. 31, 2024

(54) METHOD AND SYSTEM FOR NETWORK ACCESS MANAGEMENT OF MALFUNCTIONING END DEVICES

(71) Applicant: Verizon Patent and Licensing Inc., Basking Ridge, NJ (US)

(72) Inventors: Lixia Yan, Basking Ridge, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 390 days.

(21) Appl. No.: 17/559,450

(22) Filed: Dec. 22, 2021

(65) Prior Publication Data

US 2023/0199693 A1 Jun. 22, 2023

(51) Int. Cl.
*H04W 60/06* (2009.01)
*H04W 8/18* (2009.01)
*H04W 24/04* (2009.01)

(52) U.S. Cl.
CPC .......... *H04W 60/06* (2013.01); *H04W 8/18* (2013.01); *H04W 24/04* (2013.01)

(58) Field of Classification Search
CPC ....... H04W 60/06; H04W 8/18; H04W 24/04; H04W 60/00; H04W 60/04
See application file for complete search history.

(56) References Cited

U.S. PATENT DOCUMENTS

| | | | | |
|---|---|---|---|---|
| 10,841,344 | B1* | 11/2020 | Asveren | H04L 65/1076 |
| 11,538,287 | B2* | 12/2022 | Fang | G07C 5/0816 |
| 2017/0230932 | A1* | 8/2017 | Challa | H04W 68/02 |
| 2017/0273046 | A1* | 9/2017 | Piscopo, Jr. | H04L 65/1045 |
| 2019/0281580 | A1* | 9/2019 | Rune | H04W 76/28 |
| 2022/0108396 | A1* | 4/2022 | Gao | G06Q 30/0206 |
| 2022/0369110 | A1* | 11/2022 | Fan | H04W 24/08 |
| 2023/0133980 | A1* | 5/2023 | Xin | H04W 8/22 |
| | | | | 455/405 |
| 2023/0379856 | A1* | 11/2023 | Ryu | H04L 63/0892 |

OTHER PUBLICATIONS

Hu, Xinxin, et al. "A systematic analysis method for 5g non-access stratum signalling security." IEEE Access 7 (2019): 125424-125441. (Year: 2019).*

Alrawi, Omar, et al. "Sok: Security evaluation of home-based iot deployments." 2019 IEEE symposium on security and privacy (sp). IEEE, 2019. (Year: 2019).*

* cited by examiner

*Primary Examiner* — Sharad Rampuria

(57) ABSTRACT

A method, a device, and a non-transitory storage medium are described in which a network access management service is provided. The service may include modifying subscription data pertaining to an end device. The modification may include control data directed to remediating behavior of the end device. The service may provide the control data to the end device during a registration procedure or a deregistration procedure with the end device. The end device may execute a remedial procedure based on the control data. The service may prevent the registering of the end device to the core network. The service may deregister the end device from the core network when the end device may be registered.

20 Claims, 6 Drawing Sheets

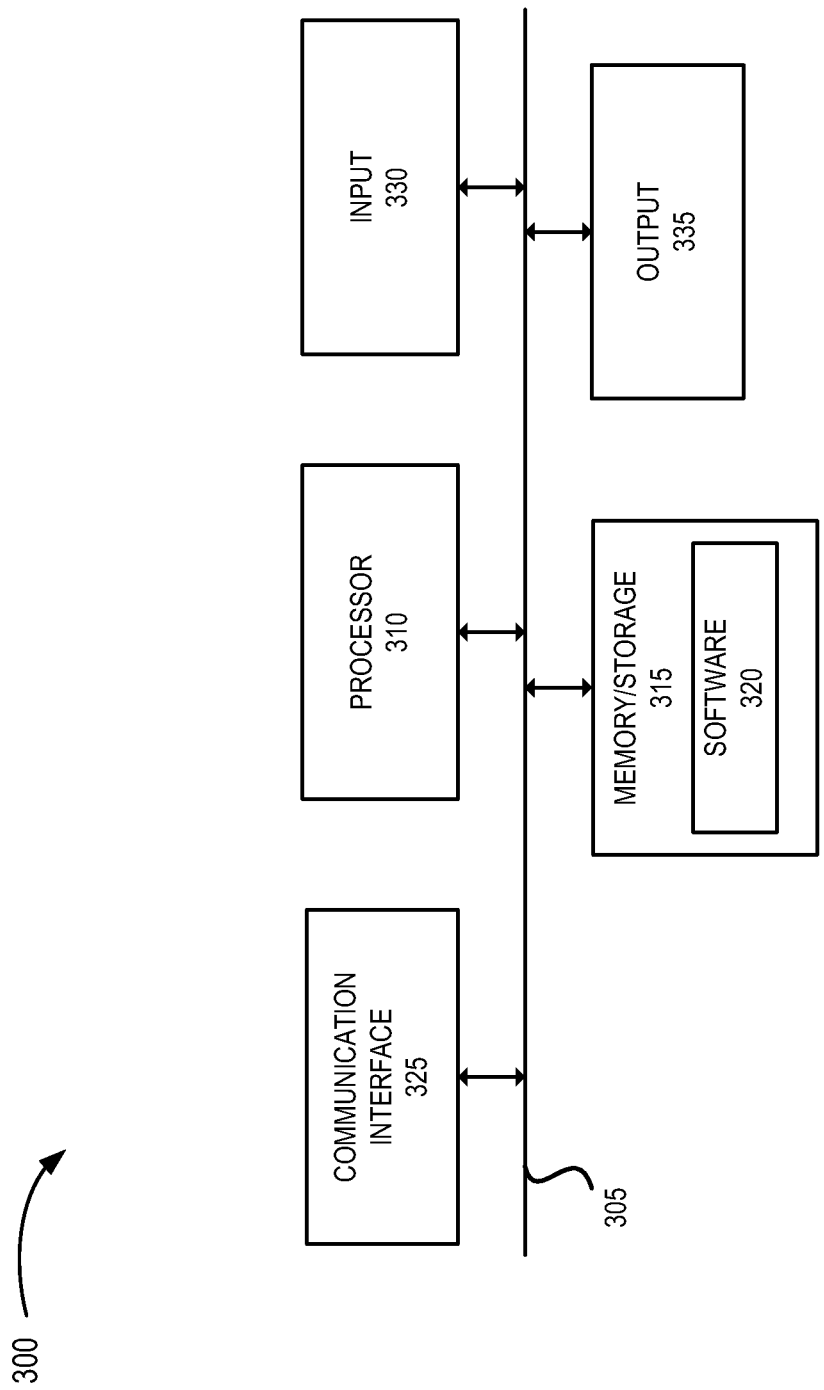

METHOD AND SYSTEM FOR NETWORK ACCESS MANAGEMENT OF MALFUNCTIONING END DEVICES

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIG. 3 is a diagram illustrating exemplary components of a device that may correspond to one or more of the devices illustrated and described herein;

DETAILED DESCRIPTION

The following detailed description refers to the accompanying drawings. The same reference numbers in different drawings may identify the same or similar elements. Also, the following detailed description does not limit the invention.

End devices, such as user equipment (UEs), may be subject to an update to enable the end devices access and use of current network services. In some instances, an end device may be misconfigured as a result of the update. Consequently, the update may cause the end device to behave in a manner that is divergent from the purpose of the update. For example, an update may cause the end device to continuously attach and detach from the network. This can lead to a significant waste of network resources in a radio access network (RAN) and a core network, as well as at the end device, for example. Depending on the behavior of the end device, the ability to isolate, intercept, and correct this behavior can be problematic.

According to exemplary embodiments, a network access management service is described. According to an exemplary embodiment, the network access management service may be directed to misconfigured or malfunctioning end devices. According to an exemplary embodiment, the network access management service may include identifying an end device as misconfigured or malfunctioning. The network access management service may prevent completion of an attachment or a registration procedure to the network based on the identification. According to another exemplary embodiment, the network access management service may include detachment or deregistering the end device from the network subsequent to completion of the attachment or the registration procedure based on the identification, as described herein.

According to an exemplary embodiment, the network access management service may manage or control the network access of the end device based on control plane signaling. According to an exemplary embodiment, a core network device may provide the control plane signaling.

According to an exemplary embodiment, the network access management service may include reconfiguring the end device that corrects the misconfiguration or malfunctioning. According to an exemplary embodiment, the network access management service may turn off the end device or restrict the end device to performing an update that corrects the misconfiguration or malfunction.

In view of the foregoing, the network access management service may prevent or minimize unnecessary use of network resources by a misconfigured or malfunctioning end device. Additionally, the network access management service may manage a remedial procedure that corrects the misconfiguration or malfunctioning of the end device.

Figure 1:
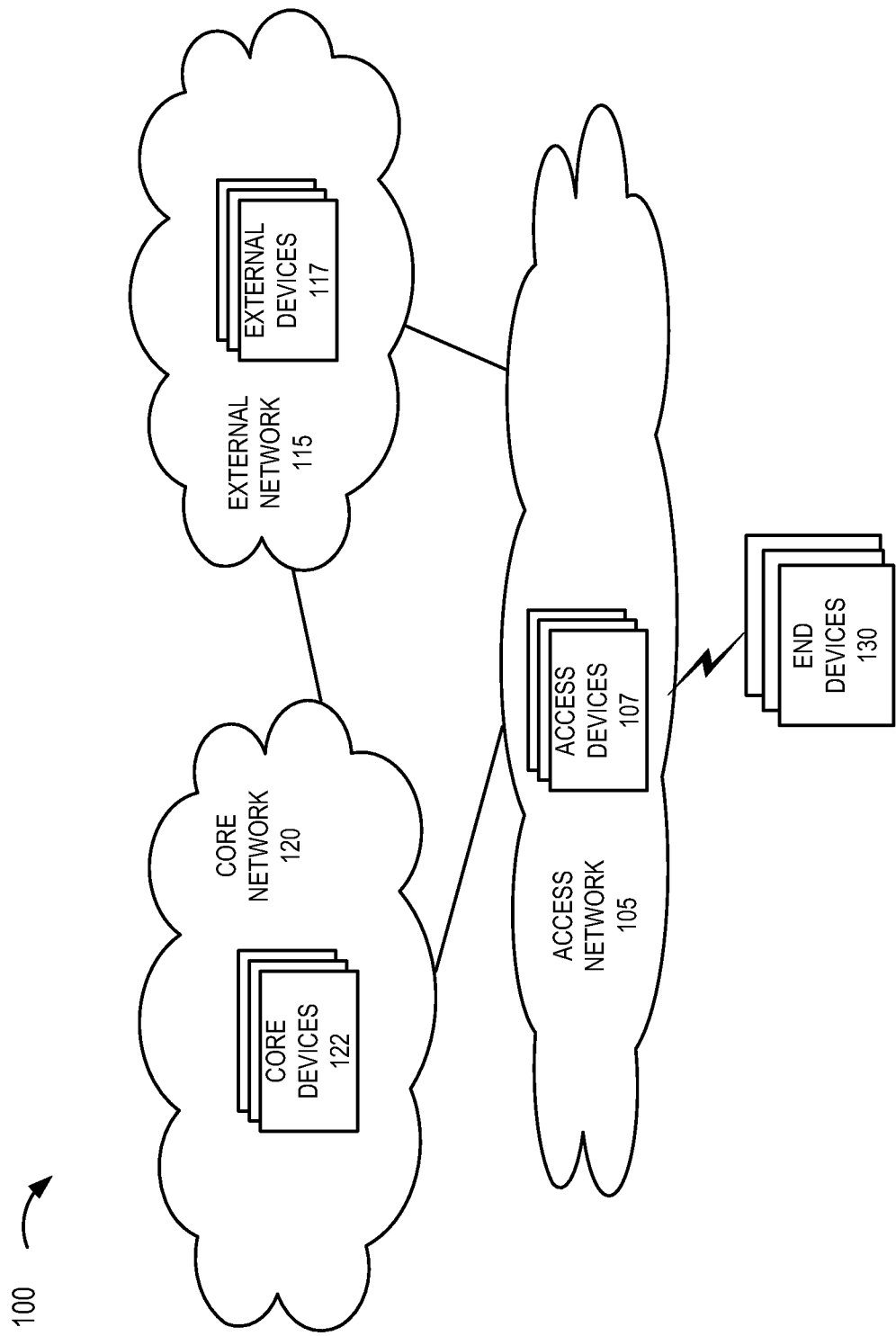
FIG. 1 is a diagram illustrating an exemplary environment in which an exemplary embodiment of a network access management service may be implemented.

FIG. 1 is a diagram illustrating an exemplary environment 100 in which an exemplary embodiment of network access management service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the network access management service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), Global System Mobile Association (GSMA), and the like) or a new interface of the network device may be provided in order to support the communication (e.g., transmission and reception of messages, an information element (IE), an attribute value pair (AVP), an object, a parameter, or another form of a data instance) between network devices and the network access management service logic of the network device. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and a core network including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies that provides an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SD network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and mobility management function (AMF), an SMF, a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, some of core devices 122 may include logic that supports or provides the network access management service, as described herein. For example, an AMF or an MME may include logic of the network access management service. According to another example, a UDM, a UDR, an HSS, or another repository that may store subscription information, may include logic of the network access management service. According to yet another example, an NRF may include logic that supports or provides the network access management service, as described herein.

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130. End devices 130 may include "edge-aware" and/or "edge-unaware" application service clients. For purposes of description, end device 130 is not considered a network device.

End device 130 may support one or multiple RATs (e.g., 4G, 5G, and/or future generation RAT) and various portions of the radio spectrum (e.g., multiple RF bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

According to an exemplary embodiment, end device 130 includes logic that provides the network access management service, as described herein. For example, end device 130 may include logic that executes a cause or non-access stratum (NAS) value pertaining to a remedial procedure associated with the network access management service, as described herein.

Figure 2A:
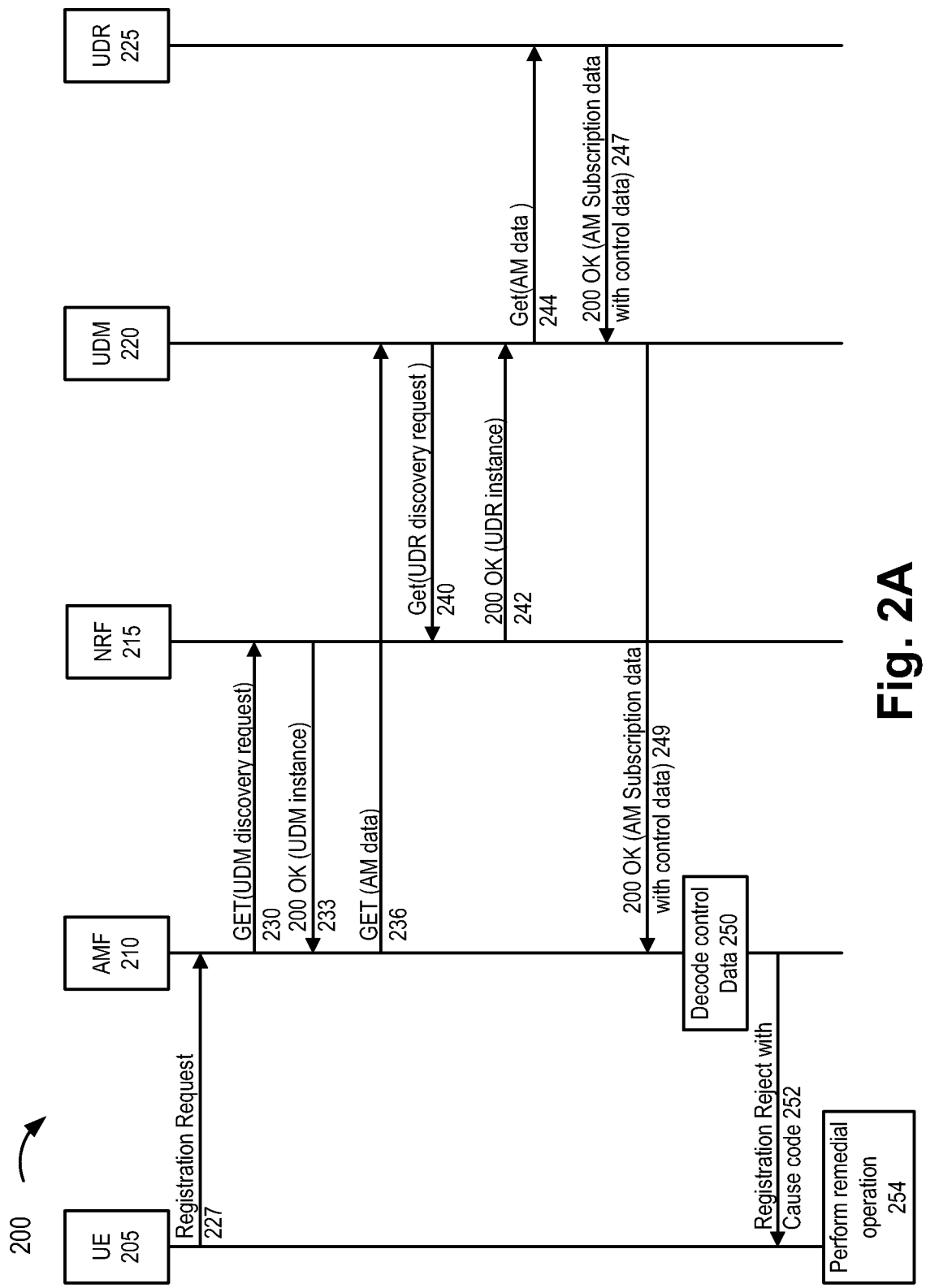
FIG. 2A is a diagram illustrating an exemplary process of an exemplary embodiment of the network access management service.

FIG. 2A is a diagram illustrating an exemplary process 200 of an exemplary embodiment of the network access management service. Process 200 may be performed in an exemplary environment that includes access device 107, core device 122, and end device 130. For example, the environment may include a UE 205 (e.g., end device 130), core devices 122 such as an AMF 210, an NRF 215, a UDM 220, and a UDR 225.

AMF 210, NRF 215, UDM 220, and UDR 225 may operate and provide network functions or services specified by a standard (e.g., 3GPP, 3GPP2, etc.) and/or of a proprietary nature. For example, AMF 210 may manage access and mobility functions associated with end devices. NRF 215 may facilitate service registration and discovery so that various other network functions may discover each other. UDM 220 and UDR 225 may store subscription data pertaining to end devices 130. Additionally, AMF 210, NRF 215, UDM 220, and UDR 225 may include logic that performs operations and/or services of the network access management service, as described herein.

According to other exemplary embodiments, the exemplary environment may include a different type of access device 107, core device 122, and/or end device 130 than that described in relation to FIG. 2A. For example, depending on the network, instead of AMF 210, UDM 220, and UDR 225, core devices 122 may be implemented as an MME, an HSS, a Home Location Register (HLR), a Mobility Switching Center (MSC), or another type of network device that may perform similar functions, in whole or in part as those of an AMF, UDM, and UDR. According to an exemplary embodiment, network access management service logic may perform a step of process 200. Also, the type of messages and the content of the messages illustrated and described in relation to FIG. 2A are exemplary. According to other exemplary embodiments, additional and/or different messages may be transmitted and/or received to implement process 200 and the network access management service, as described herein. Some messages may have been omitted for the sake of brevity.

Referring to FIG. 2A, according to an exemplary scenario, assume UE 205 generates and transmits a Registration Request 227 to AMF 210 subsequent to completion of a Radio Resource Control (RRC) procedure with access device 107 (e.g., a gNB or another type of access device 107—not illustrated). The message may include a Registration Request message and other data (e.g., a UE Policy Section Identifier (UPSI) List Transport message, an end device identifier (e.g., Globally Unique Temporary Identifier (GUTI), a Subscription Permanent Identifier (SUPI), an International Mobile Subscriber Identity (IMSI), a Subscribed Concealed Identifier (SUCI), or the like, etc.). Registration Request 227 may indicate a request for UE 205 to register with core network 120 and/or AMF 210. AMF 210 may receive Registration Request 227 via access device 107. In response to receiving and reading the message, AMF 210 may execute a registration procedure. Depending on the end device identifier received, AMF 210 may map the end device identifier to another end device identifier pertaining to UE 205 (e.g., map a GUTI to a SUPI, etc.). AMF 210 may transmit a GET message 230 that includes a discovery request for a UDM. The discovery request may indicate the type of network function requested (e.g., UDM), requester type information (e.g., AMF, identifier of AMF, etc.) according to an NF consumer/NF producer model. The discovery request may further include an identifier of UE 205 (e.g., SUPI, etc.).

NRF 215 may receive and read GET message 230, and in response, perform a lookup and identify a UDM instance that may be available to be discovered by AMF 210. Based on the lookup NRF 215 may generate and transmit a 200 OK message 233. Message 233 may include a discovery response that includes indications or information pertaining to the requested type of NF (e.g., UDM). In response to receiving and reading message 233, AMF 210 may analyze the indications of UDM(s), and based on the analysis, AMF 210 may generate and transmit a GET message 236 to the selected UDM (e.g., UDM 220). GET message 236 may include a request for access and mobility management (AM) data and/or another portion of subscription data pertaining to UE 205.

In response to receiving and reading GET message 236, UDM 220 may initiate a discovery procedure with NRF 215 in which UDM 220 may generate and transmit a GET message 240 to NRF 215. GET message 240 may include a discovery request for a UDR. The discovery request may indicate the type of network function requests (e.g., UDR) and requester type information (e.g., UDM, identifier of UDM, etc.). The discovery request may further include an identifier of UE 205. NRF 215 may receive and read GET message 240, and in response, perform a lookup and identify a UDR instance that may be available to be discovered by UDM 220. Based on the lookup NRF 215 may generate and transmit a 200 OK message 242. Message 242 may include a discovery response that includes indications or information pertaining to the requested type of NF (e.g., UDR).

In response to receiving and reading message 242, UDM 220 may analyze the indications of UDR(s), and based on the analysis, UDM 220 may generate and transmit a GET message 244 to the selected UDR (e.g., UDR 225). GET message 244 may include a request for subscription and/or AM data for UE 205. The request may include an identifier of UE 205 (e.g., SUPI, etc.), a serving Public Land Mobile Network (PLMN) identifier, and/or the like. As further illustrated, UDR 225 may receive and read GET message 244, perform a lookup, and generate and transmit a 200 OK message 247 to UDM 220. Message 247 may include AM and/or subscription data pertaining to UE 205. According to an exemplary embodiment, the AM and/or subscription data may include control data. The control data may indicate that UE 205 is a malfunctioning, misconfigured, and/or another designation that indicates that end device 130 is subject to the network access management service, as described herein. Additionally, or alternatively, the control data may include a remedial command. For example, the remedial command may indicate for UE 205 to power down or turn off, disable UE 205 (e.g., temporarily or permanently), or another type of command (e.g., restrict subsequent access to the network to first update software or perform an over-the-air (OTA) update before registering and/or attaching to the network, indicate an access point name (APN), and/or another remedial operation).

According to an exemplary embodiment, process 200 may include the identification of end devices 130, such as UE 205, as a misconfigured, malfunctioning, or another designation type of end device 130 that is subject to the network access management service, as described herein. Additionally, or alternatively, process 200 may include the configuration of AM and/or subscription data relating to the identified end device 130, such that the configuration data includes the control data, as described herein. For example, UDR 225 may be configured with the control data pertaining to UE 205, which enables the transmission of message 247. This aspect of the network access management service is described further in relation to process 255 of FIG. 2B.

Referring to FIG. 2A, UDM 220 may receive and read message 247, and in response may generate and transmit a 200 OK message 249 to AMF 210. Message 249 may include the AM and/or subscription data, which includes the control data. For example, the control data may be included in an IE of AM profile data. In response to receiving and reading message 249, AMF 210 may decode the control data 250. For example, AMF 210 may read, analyze, and/or generate a corresponding cause or a NAS code or value. The cause or NAS data may include data indicating a remedial command or procedure to be performed UE 205. According to an exemplary embodiment, the control or NAS code value may be different than the control data. According to another exemplary embodiment, AMF 210 may store a database or a data structure (e.g., a table or other suitable data structure) that may store mappings or correlations between control data and cause or NAS code values.

Based on the decoding of the control data, AMF 210 may generate and transmit a Registration Reject 252 to UE 205. Registration Reject 252 may include the cause or NAS data. For example, AMF 210 may insert the cause or NAS data in an IE of Registration Reject 252. Based on receiving and reading Registration Reject 252, UE 205 may perform a remedial operation 254. For example, a modem or other component of UE 205 may read the cause or NAS code or value, and in response call an application programming interface (API) to pass the data, code, or value to the operating system (OS) layer of UE 205. According to an exemplary implementation, the OS layer of UE 205 may automatically power down UE 205 and disable UE 205 (e.g., temporarily or permanently) from accessing the network. According to another exemplary implementation, UE 205 may initiate a software update procedure such that the software update may correct the malfunction and/or misconfiguration, for example. For example, UE 205 may, after powering down or not, request and establish a PDN or a PDU session that will provision UE 205 with the update. By way of further example, UE 205 may establish the PDN or the PDU session with external device 117 of external network 115 that may be configured to provision UE 205.

FIG. 2A illustrates and describes an exemplary process of an exemplary embodiment of the network access management service, however according to other exemplary embodiments, the network access management service may include additional, different and/or fewer operations relative to those described.

Figure 2B:
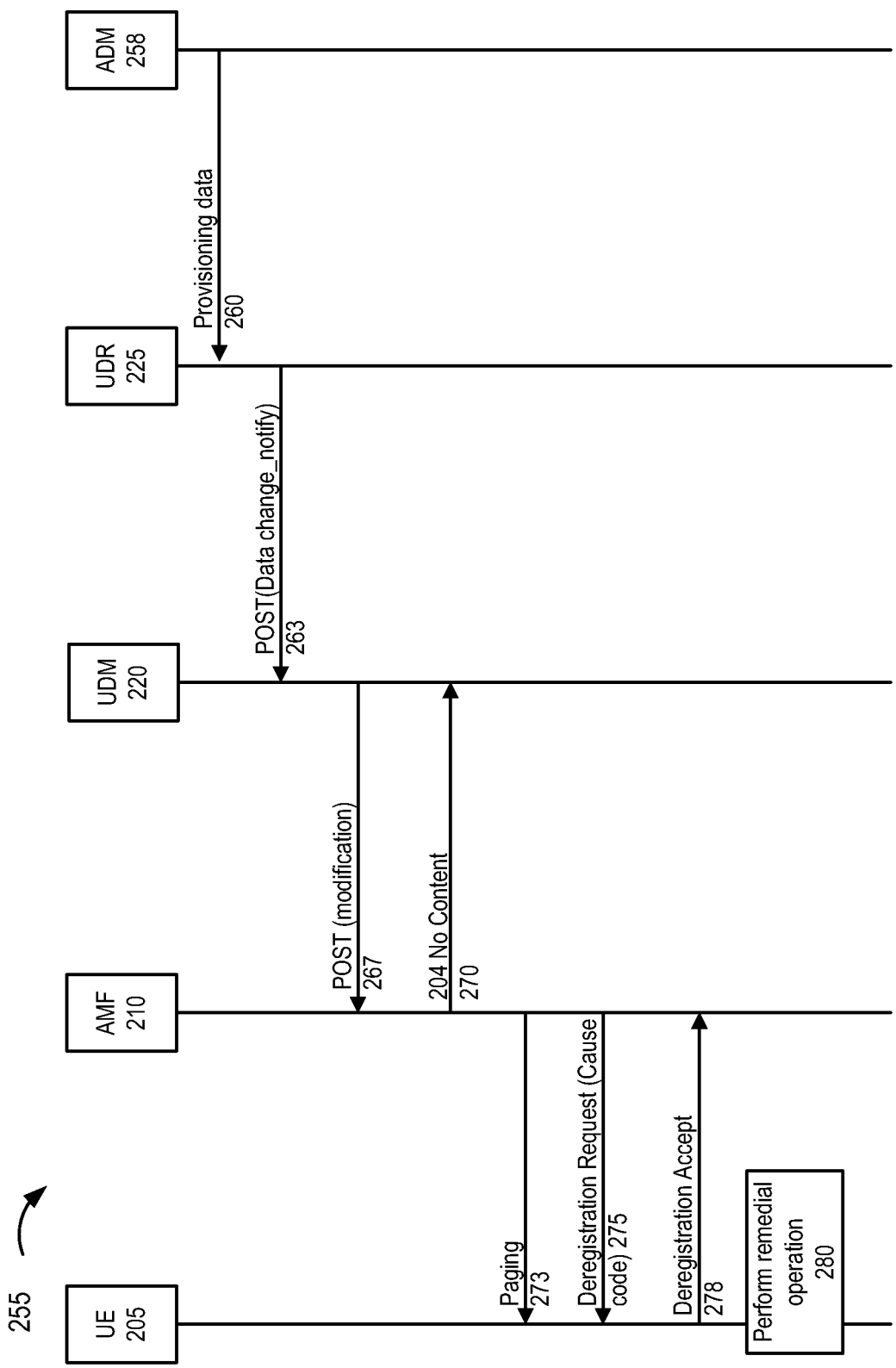
FIG. 2B is a diagram illustrating another exemplary process of an exemplary embodiment of the network access management service.

FIG. 2B is a diagram illustrating another exemplary process 255 of an exemplary embodiment of the network access management service. Process 255 may be performed in an exemplary environment that includes access device 107, core device 122, and end device 130. For example, the environment may include UE 205 (e.g., end device 130), core devices 122 such as AMF 210, UDM 220, and UDR 225. The environment may also include an administrative management (ADM) device 258. For example, ADM 258 may include a device that enables a network administrator or the like to configure AM data with control data for end devices 130 of relevance or such provisioning procedure may be performed automatically (e.g., wholly or partially).

According to other exemplary embodiments, the exemplary environment may include a different type of access device 107, core device 122, and/or end device 130 than that described in relation to FIG. 2B. According to an exemplary embodiment, network access management service logic may perform a step of process 255. Also, the type of messages and the content of the messages illustrated and described in relation to FIG. 2B are exemplary. According to other exemplary embodiments, additional and/or different messages may be transmitted and/or received to implement process 255 and the network access management service, as described herein. Some messages may have been omitted for the sake of brevity.

Referring to FIG. 2B, assume that a network administrator or a network device has identified UE 205 as an end device subject to the network access management service. For example, the network administrator or the network device may identify (recent) behavior of UE 205 that is indicative of a misconfiguration, a malfunction, or another type of undesirable behavior based on network logs or other type of information (e.g., customer service information, network security information, revenue assurance information). Based on this identification, ADM 258 may provision AM data and/or other subscription data of UE 205 with control data 260 at UDR 225. According to an exemplary scenario, the provisioning may occur after UE 205 has already registered and/or attached to core network 120.

In response to the provisioning, UDR 225 may determine whether (e.g., based on the subscription data associated with UE 205) UE 205 is currently registered with core network 120 or not. Based on a determination that UE 205 is currently registered (e.g., the presence of AM data), UDR 225 may generate and transmit a POST message 263 to UDM 220. For example, POST message 263 may include a notification that indicates a data change. POST message 263 may include a location or address (e.g., a Uniform Resource Indicator (URI) or the like) of UDM 220 for storing data pertaining to UE 205. POST message 263 may include the control data, as described herein. In response to receiving POST message 263, UDM 220 may map POST message 263 to an identifier of UE 205 (e.g., the URI to a SUPI or the like). UDM 220 may also select the AMF (e.g., AMF 210) with which UE 205 is currently registered. UDM 220 may generate and transmit a POST message 267 to AMF 210. POST message 267 may include a notification that indicates modification of AM data and the control data.

In response to receiving and reading POST message 267, AMF 210 may generate and transmit a reply, such as a 204 No Content message 270. Additionally, based on POST message 267, AMF 210 may determine that UE 205, which pertains to the modified AM data, is currently registered with core network 120 and/or AMF 210. AMF 210 may identify the modification of AM data as indicating to deregister UE 205. AMF 210 may page 273 UE 205. Thereafter, AMF 210 may generate and transmit a Deregistration Request 275 to UE 205. Deregistration Request 275 may include the cause or NAS code data, as described herein. In response to receiving and reading Deregistration Request 275, UE 205 may generate and transmit a Deregistration Accept 278 to AMF 210. Additionally, as described herein, UE 205 may perform a remedial operation 280 corresponding to the cause data.

FIG. 2B illustrates and describes an exemplary process of an exemplary embodiment of the network access management service, however according to other exemplary embodiments, the network access management service may include additional, different and/or fewer operations relative to those described.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to core device 122 (e.g., AMF 210, NRF 215, UDM 220, ADM 258, or the like), software 320 may include an application that, when executed by processor 310, provides a function and/or a process of network access management service, as described herein. Additionally, with reference to end device 130 (e.g., UE 205 or the like), software 320 may include an application that, when executed by processor 310, provides a function and/or a process of network access management service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
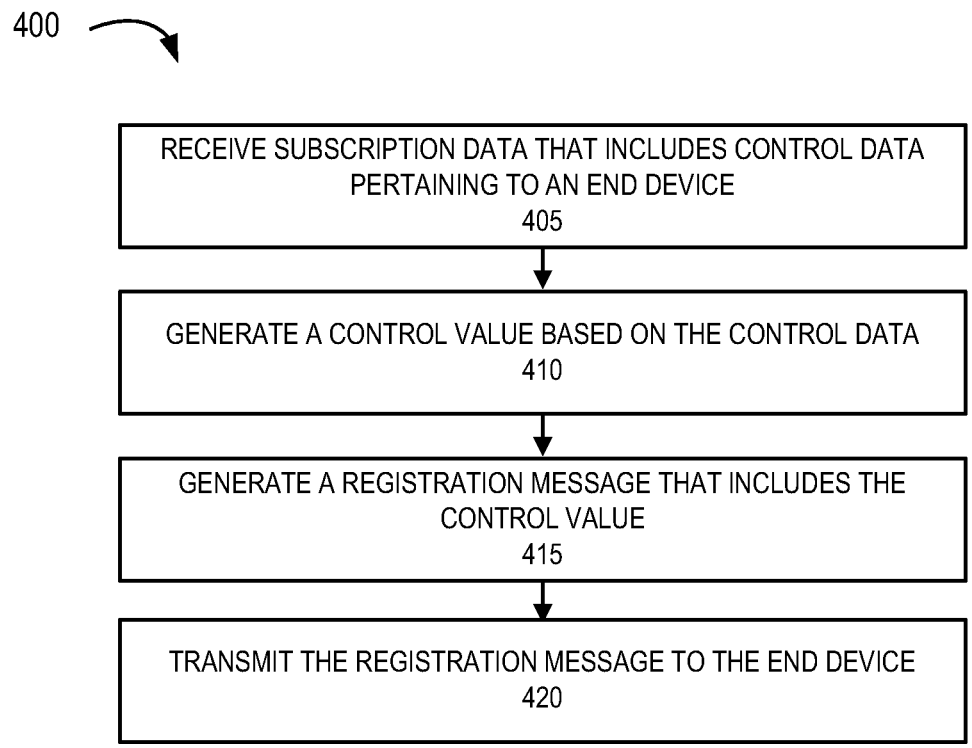
FIG. 4 is a flow diagram illustrating yet another exemplary process of an exemplary embodiment of the network access management service.

FIG. 4 is a flow diagram illustrating an exemplary process 400 of an exemplary embodiment of the network access management service. According to an exemplary embodiment, AMF 210 or a similar functioning network device (e.g., an MME or the like) may perform a step of process 400. According to an exemplary implementation, processor 310 executes software 320 to perform the step of process 400, as described herein. Alternatively, the step may be performed by execution of only hardware.

In block 405, AMF 210 may receive subscription data that includes control data pertaining to an end device 130. For example, AMF 210 may receive AM data that includes control data from UDM 220 or a similar network device (e.g., an HSS or the like), as described herein. The control data may pertain to a behavior (e.g., misconfigured, malfunctioning) of end device 130 relative to core network 120. The control data may include data indicating a designation of end device 130 that is subject to a network access management service, as described herein. The control data may include data indicating a remedial process or operation for end device 130.

In block 410, AMF 210 may generate a control value based on the control data. For example, AMF 210 may decode or analyze the control data and generate the control or NAS value, as described herein. The control or NAS value may indicate a remedial operation or command, as described herein. According to another exemplary implementation, AMF 210 may store data that maps control data to a control or NAS value. AMF 210 may compare the control data to the stored data, and select the control or NAS code based on a matching procedure.

In block 415, AMF 210 may generate a registration message that includes the control value. For example, depending on whether end device 130 is attempting to register or has already registered with AMF 210 and/or core network 120, the registration message may be a Registration Reject message or a Deregistration Request message.

In block 420, AMF 210 may transmit the registration message to end device 130. For example, AMF 210 may transmit the Registration Reject message or the Deregistration Request message via a control plane (e.g., NAS). AMF 210 may prevent the registering or deregisters end device 130 after the transmission of the registration message, as described herein.

FIG. 4 illustrates an exemplary embodiment of a process of the network access management service, according to other exemplary embodiments, the network access management service may perform additional operations, fewer operations, and/or different operations than those illustrated and described. For example, AMF 210 may page end device 130 before transmitting the Deregistration Request message to end device 130. AMF 210 may map the subscription data to end device 130 based on an end device identifier of end device 130. Process 400 may also include operations performed at end device 130 and/or operations performed for configuring subscription data with the control data.

Figure 5:
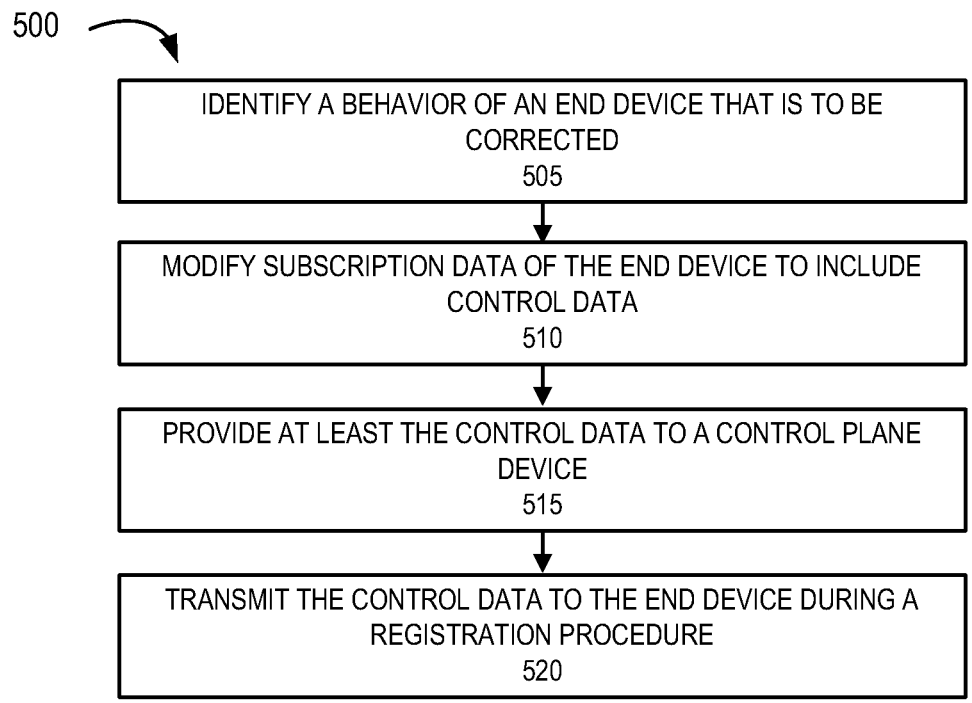
FIG. 5 is a flow diagram illustrating still another exemplary process of an exemplary embodiment of the network access management service.

FIG. 5 is a flow diagram illustrating an exemplary process 500 of an exemplary embodiment of the network access management service. According to an exemplary embodiment, core network 120 may perform process 500. According to an exemplary implementation, processor 310 executes software 320 to perform the step of process 500, as described herein. Alternatively, the step may be performed by execution of only hardware.

In block 505, core network 120 may identify a behavior of end device 130 that is to be corrected. For example, the behavior may stem from a misconfiguration or a malfunction of end device 130.

In block 510, core network 120 may modify subscription data of end device 130 to include control data. For example, the control data may include data indicating a designation of end device 130 that is subject to a network access management service, as described herein. The control data may include data indicating a remedial process or operation for end device 130 associated with the behavior.

In block 515, core network 120 may provide at least the control data to a control plane device. For example, core network 120 may provide the control data or AM data that includes the control data to AMF 210 or the like of core network 120.

In block 520, core network 120 may transmit the control data to end device 130 during a registration procedure. For example, the control data may be included in a Registration Reject message or a Deregistration Request message.

FIG. 5 illustrates an exemplary embodiment of a process of the network access management service, according to other exemplary embodiments, the network access management service may perform additional operations, fewer operations, and/or different operations than those illustrated and described. For example, after end device 130 may successfully complete the remedial process (e.g., update software or another remedial operation), core network 120 may remove the control data from the subscription data of end device 130.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device of a core network, subscription data of an end device that includes control data indicating that the end device is malfunctioning or misconfigured;
   generating, by the network device, a control value based on the control data, wherein the control value includes a remedial command to be performed by the end device;
   generating, by the network device, a registration message that includes the control value; and
   transmitting, by the network device to the end device, the registration message.

2. The method of claim 1, wherein the registration message includes a registration reject message or a deregistration request message.

3. The method of claim 1, wherein the control value includes data indicating to permanently power off the end device or disable the end device.

4. The method of claim 1, wherein the subscription data is received from another network device of the core network.

5. The method of claim 1, wherein the control value includes a non-access stratum code value.

6. The method of claim 1, wherein the control value includes data indicating to perform a software update procedure.

7. The method of claim 1, further comprising:
   preventing registering, by the network device after the transmitting, of the end device to the core network; or
   deregistering, by the network device after the transmitting, the end device from the core network.

8. The method of claim 1, wherein the network device includes an access and mobility management function device or a mobility management entity device.

9. A network device comprising:
   a processor configured to:
      receive subscription data of an end device that includes control data indicating that the end device is malfunctioning or misconfigured, wherein the network device is of a core network;
      generate a control value based on the control data, wherein the control value includes a remedial command to be performed by the end device;
      generate a registration message that includes the control value; and
      transmit to the end device the registration message.

10. The network device of claim 9, wherein the registration message includes a registration reject message or a deregistration request message.

11. The network device of claim 9, wherein the control value includes data indicating to permanently power off the end device or disable the end device.

12. The network device of claim 9, wherein the subscription data is received from another network device of the core network.

13. The network device of claim 9, wherein the control value includes a non-access stratum code value.

14. The network device of claim 9, wherein the control value includes data indicating to perform a software update procedure.

15. The network device of claim 9, wherein the network device includes an access and mobility management function device or a mobility management entity device.

16. The network device of claim 9, wherein the processor is configured to:
   prevent registering, after the transmission of the registration message, of the end device to the core network; or
   deregister, after the transmission of the registration message, the end device from the core network.

17. A non-transitory computer-readable storage medium storing instructions executable by a processor of a network device of a core network, wherein the instructions are configured to:
   receive subscription data of an end device that includes control data indicating that the end device is malfunctioning or misconfigured;
   generate a control value based on the control data, wherein the control value includes a remedial command to be performed by the end device;
   generate a registration message that includes the control value; and
   transmit to the end device the registration message.

18. The non-transitory computer-readable storage medium of claim 17, wherein the registration message includes a registration reject message or a deregistration request message.

19. The non-transitory computer-readable storage medium of claim 17, wherein the subscription data is received from another network device of the core network.

20. The non-transitory computer-readable storage medium of claim 17, wherein the instructions are further configured to:
prevent registering, after a transmission of the registration message, of the end device to the core network; or
deregister, after a transmission of the registration message, the end device from the core network.

* * * * *